US006522744B1

(12) United States Patent
Chiang

(10) Patent No.: US 6,522,744 B1
(45) Date of Patent: Feb. 18, 2003

(54) VOLUME CONTROL APPARATUS OF TELEPHONE

(76) Inventor: Jung-Hsun Chiang, No. 24, Lane 9, Ju Hsing Street, Tu Cheng City, Taipei Hsien (TW)

( * ) Notice: Subject to any disclaimer, the term of this patent is extended or adjusted under 35 U.S.C. 154(b) by 451 days.

(21) Appl. No.: 09/583,238

(22) Filed: May 31, 2000

(51) Int. Cl.[7] .................................................. H04M 1/00
(52) U.S. Cl. .................................................. 379/373.01
(58) Field of Search ........................ 379/373.01, 373.02, 379/374.01, 374.02, 374.03, 375.01

(56) References Cited

U.S. PATENT DOCUMENTS 4,823,379 A * 4/1989 Palmer .................. 379/373.01

* cited by examiner

*Primary Examiner*—Jack Chiang
(74) *Attorney, Agent, or Firm*—Troxell Law Office PLLC

(57) ABSTRACT

A volume control apparatus of telephone comprises a base assembly including a plurality of recesses, a gong assembly secured to the base assembly, a drive device threadedly secured to the base assembly including a clapper slidably provided therein, and a volume control assembly secured to the base assembly including a lever having a protrusion, a bent stopper engaged with the lever, and an engagement member; wherein the protrusion of the lever is selectively engaged with one of the recesses when the lever is moved to a locked position, resulting in a distance change of the clapper with respect to the engagement member and the gong assembly respectively, thereby generating a plurality of corresponding sound volumes when the clapper reciprocally hits on the gong assembly and the stopper.

5 Claims, 6 Drawing Sheets

VOLUME CONTROL APPARATUS OF TELEPHONE

FIELD OF THE INVENTION

The present invention relates to a volume control apparatus of telephone with improved features.

BACKGROUND OF THE INVENTION

A conventional volume control apparatus of telephone is shown in FIG. 1 comprising a ringer coil 11, an assembly 12 consisting of a number of associated members a bent clapper 13 having a head 131, a post 14, a base 141 for supporting post 14, and an auxiliary hook member 15 for holding post 14.

In operation, clapper 13 is activated by the magnetic force of the electro-magnetically excited ringer coil 11 to hit on gong 16, while clapper 13 is kept at a predetermined distance from post 14.

However, such design suffered from a disadvantage of poor positioning of clapper 13 with respect to post 14 as time passes. This problem is partly because the precision of clapper 13 is not always kept at a uniform level in manufacturing. As a result, the volume control functionality is neutralized.

Thus, it is desirable to provide an improved volume control apparatus of telephone in order to overcome the above drawback of prior art.

SUMMARY OF THE INVENTION

It is therefore an object of the present invention to provide a volume control apparatus of telephone comprising a base assembly including a central cylindrical member, a threaded bore in the cylindrical member, and a plurality of recesses; a gong assembly including a plastic inner gong with a top hole and a metal outer gong with a top aperture wherein the inner gong is put on the central cylindrical member and the outer gong is threadedly secured to the bore to secure the gong assembly to the base assembly; a drive device threadedly secured to the base assembly including a pair of opposed magnets, a ringer coil, a case for receiving the magnets, a clapper slidably provided in the ringer coil, and a cap member covered on the case; and a volume control assembly threadedly secured on the bottom of the base assembly including a lever having a protrusion and a hole, a bent stopper having a protrusion engaged with the hole of the lever, and an engagement member; wherein the protrusion of the lever is selectively engaged with one of the recesses when the lever is moved to a locked position, resulting in a distance change of the clapper with respect to the engagement member and the gong assembly respectively, thereby generating a plurality of corresponding sound volumes when the clapper reciprocally hits on the gong assembly and the stopper.

The above and other objects, features and advantages of the present invention will become apparent from the following detailed description taken with the accompanying drawings.

BRIEF DESCRIPTION OF THE DRAWINGS

FIGS. 4-1, 4-2, and 4-3 are schematic bottom plan views of the assembled apparatus to illustrate three volume control positions thereof;

FIGS. 5-1, 5-2, and 5-3 are schematic side views the assembled apparatus corresponding to the volume control positions shown in FIGS. 4-1, 4-2, and 4-3 respectively.

DETAILED DESCRIPTION OF PREFERRED EMBODIMENTS

Figure 2:
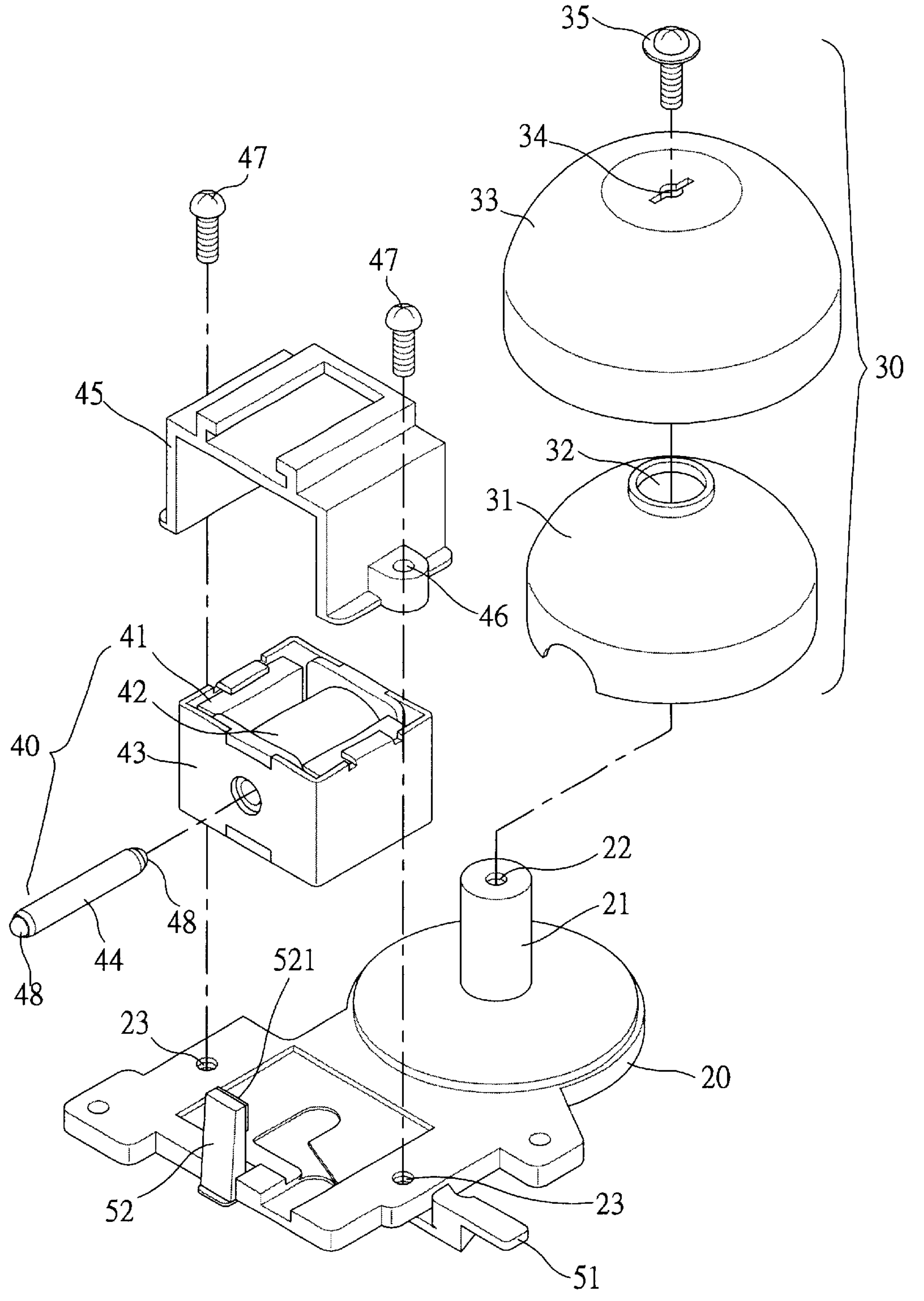
FIG. 2 is an exploded view of a volume control apparatus of telephone according to the invention.
Figure 3:
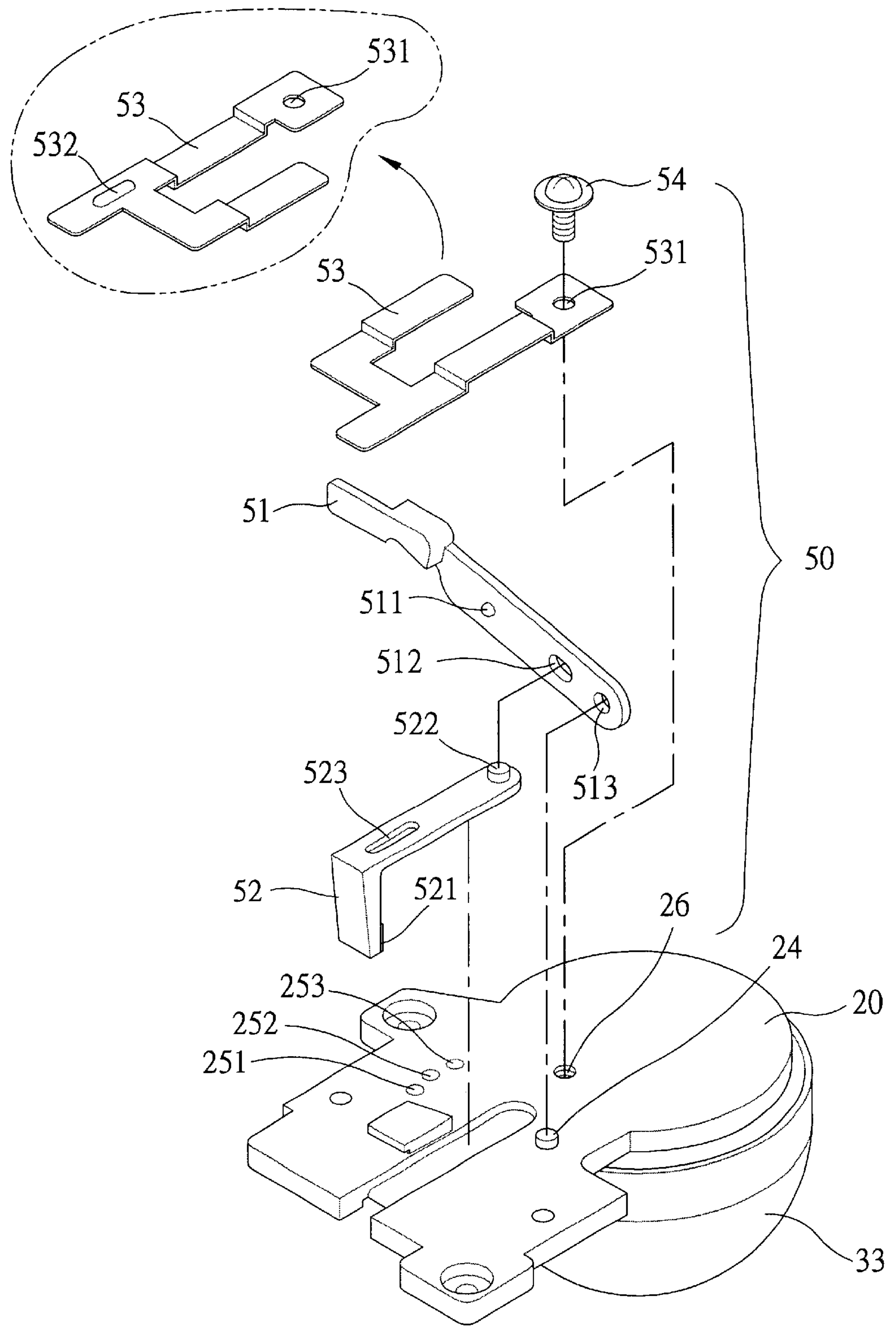
FIG. 3 is a partial exploded view of FIG. 2 viewed from the bottom.

Referring to FIGS. 2 and 3, there is shown a volume control apparatus of telephone constructed in accordance with the present invention comprising a gong assembly 30 including a plastic inner gong 31 with a top hole 32 and a metal outer gong 33 with a top aperture 34, a drive device 40, a base assembly 20 including a central cylindrical member 21 with inner gong 31 put on, a threaded bore 22 in the cylindrical member 21, and two opposed holes 23, and a volume control assembly 50. A screw 35 is threaded through aperture 34 to engage with bore 32 for securing gong assembly 30 to base assembly 20. Drive device 40 includes a pair of opposed magnets 41, a ringer coil 42, a case 43 for receiving magnets 41 and ringer coil 42, a clapper 44 slidably provided in the ringer coil 42, a cap member 45 covered on case 43 having two opposed side holes 46 for permitting screws 47 to thread through holes 23 for securing the drive device to base assembly 20. A pad 48 made of plastic or metal material (e.g., copper) is provided on either end of clapper 44 such that a clear sound may be produced when clapper 44 hits the outer gong 33. Volume control assembly 50 is provided on the bottom of base assembly 20 including a lever 51, an engagement member 53 having a raised member 532 on the bottom (see the circle on the top left corner of FIG. 3), and an about 90 degrees bent stopper 52 having a protrusion 522, an elongate slot 523, and a cushion 521 corresponding to the pad 48 of clapper 44. This also results in a clear sound produced when clapper 44 hits the stopper 52.

Referring to FIG. 3 specifically, lever 51 includes a projection 511 on the side facing base assembly 20 and two holes 512 and 513 wherein hole 512 is put on protrusion 522 of stopper 52, raised member 532 is inserted and horizontally slidable in the slot 523, and hole 513 is put on protrusion 24.

Note that projection 511 is selectively engaged with one of recesses 251, 252, and 253 when lever 51 is moved to a locked position. Also, a screw 54 is threaded through hole 531 and hole 26 to secure the volume control assembly 50 to base assembly 20.

Figure 1:
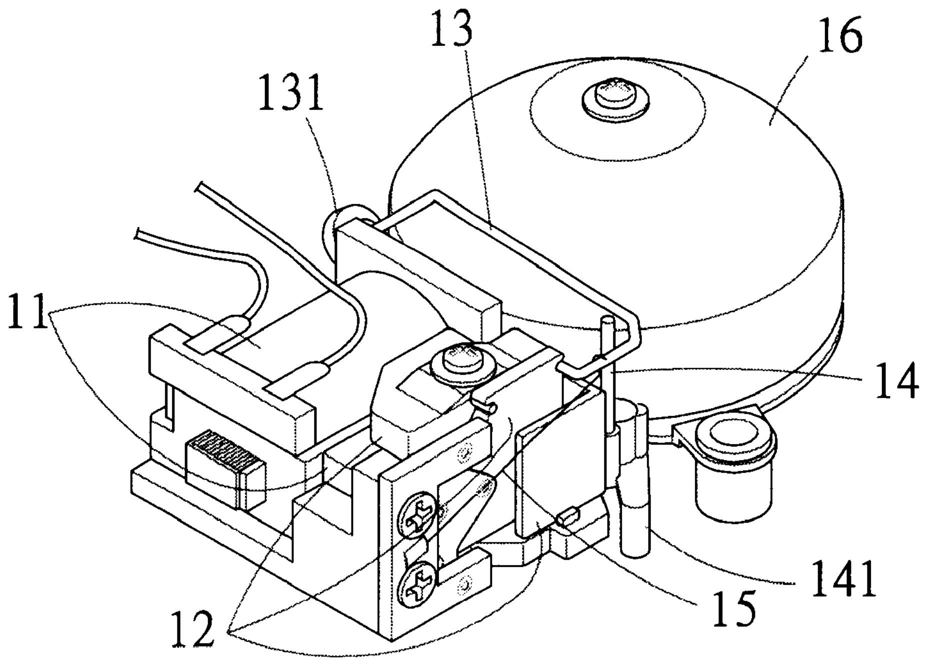
FIG. 1 (PRIOR ART)
FIG. 1 is a perspective view of a conventional volume control apparatus of telephone.
Figures 1, 4:
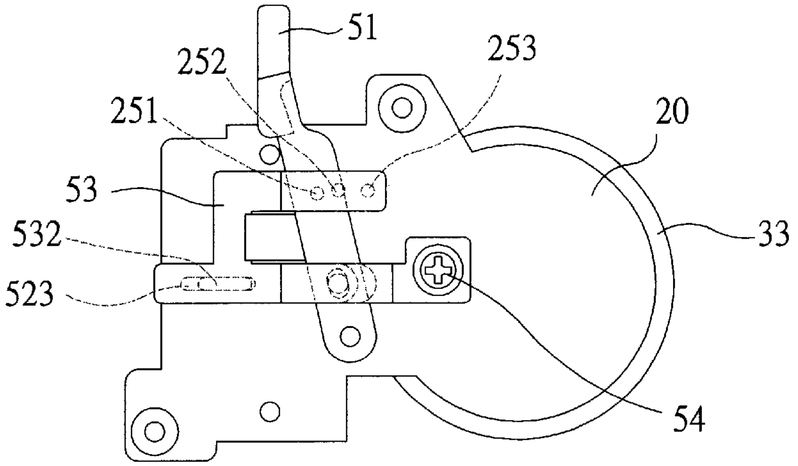
Figures 2, 4:
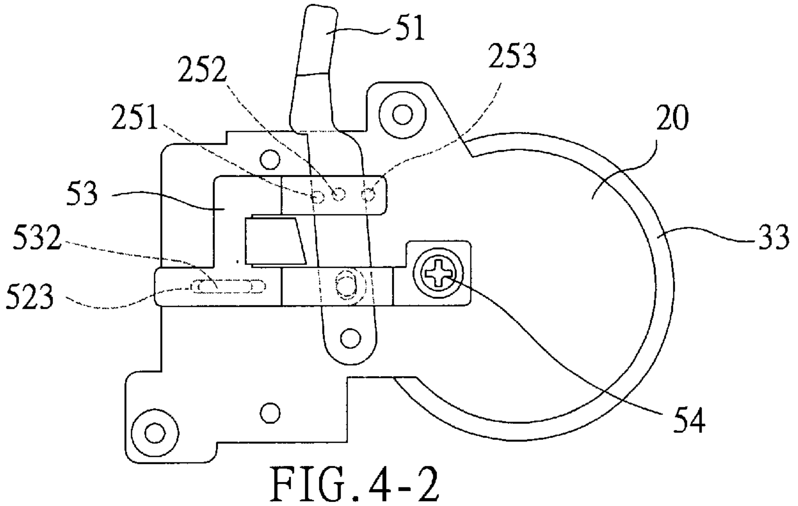
Figures 3, 4:
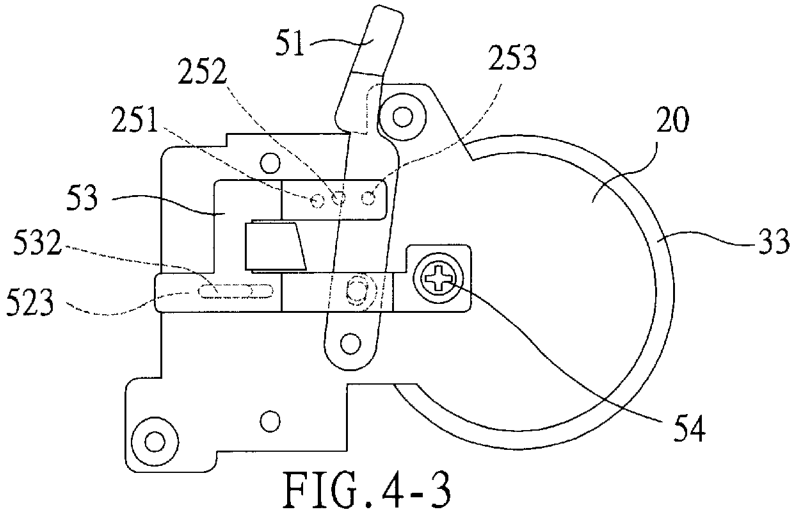

Referring to FIGS. 4-1, 4-2, and 4-3, the operation of volume control of the invention is described below. As shown in FIG. 4-1, projection 511 is engaged with recess 251 when lever 51 is moved to the left. At this time, volume is adjusted to its maximum. Similarly, as shown in FIG. 4-2, projection 511 is engaged with recess 252 when lever 51 is moved to the center. At this time, volume is adjusted to its medium. Also similarly, as shown in FIG. 4-3, projection 511 is engaged with recess 253 when lever 51 is moved to the right. At this time, volume is adjusted to its minimum (i.e., mute).

Figures 1, 5:
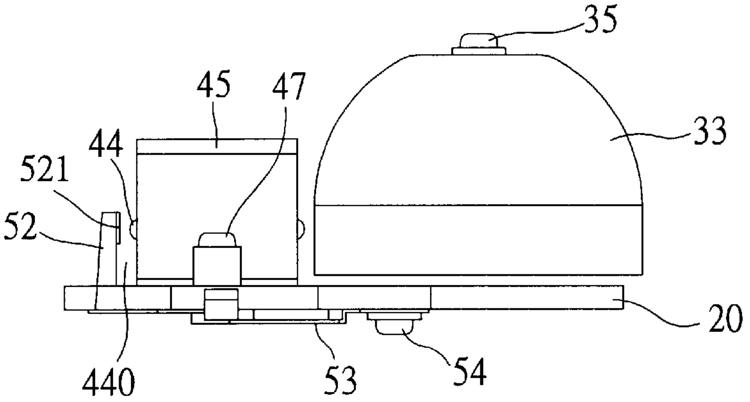
Figures 2, 5:
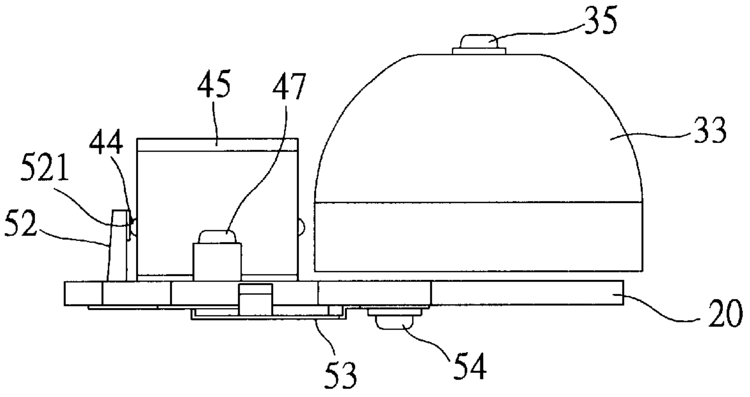
Figures 3, 5:
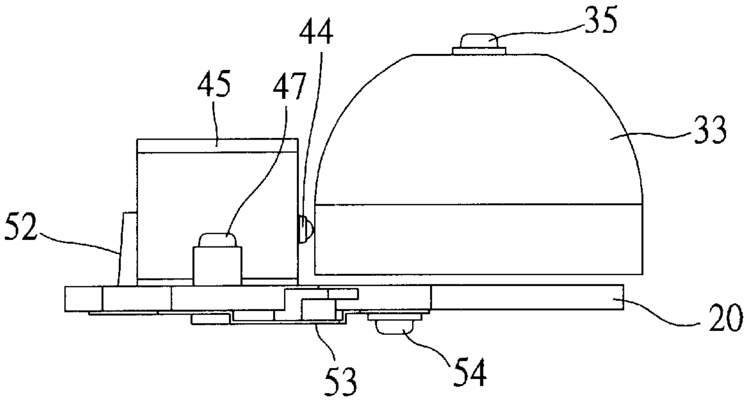

Referring to FIGS. 5-1, 5-2, and 5-3, these figures are corresponding to FIGS. 4-1, 4-2, and 4-3 respectively. As shown in FIG. 5-1, stopper 52 has been adjusted to be spaced apart from clapper 44 by a gap 440 as well as clapper 44 is spaced from outer gong 33 by another gap. As such, the allowable moving distance to-and-fro of clapper 44 is maximum when activated by the excited ringer coil 42 of drive device 40. As a result, the generated sound is maximum when clapper 44 reciprocally hits on outer gong 33 and stopper 52. In contrast, as shown in FIG. 5-2, stopper 52 has been adjusted to engage with clapper 44. As such, the allowable moving distance to-and-fro of clapper 44 is reduced when activated by the excited ringer coil 42 of drive device 40. As a result, the generated sound is medium when clapper 44 reciprocally hits on outer gong 33 and stopper 52. Also in contrast, as shown in FIG. 5-3, stopper 52 has been adjusted to force one end of clapper 44 to completely retract into the drive device 40, while the other end of clapper 44 is engaged with outer gong 33. As such, clapper 44 is fixedly secured (i.e., without motion) even when activated by the excited ringer coil 42. As a result, the generated sound is minimum (i.e., mute).

Figure 6:
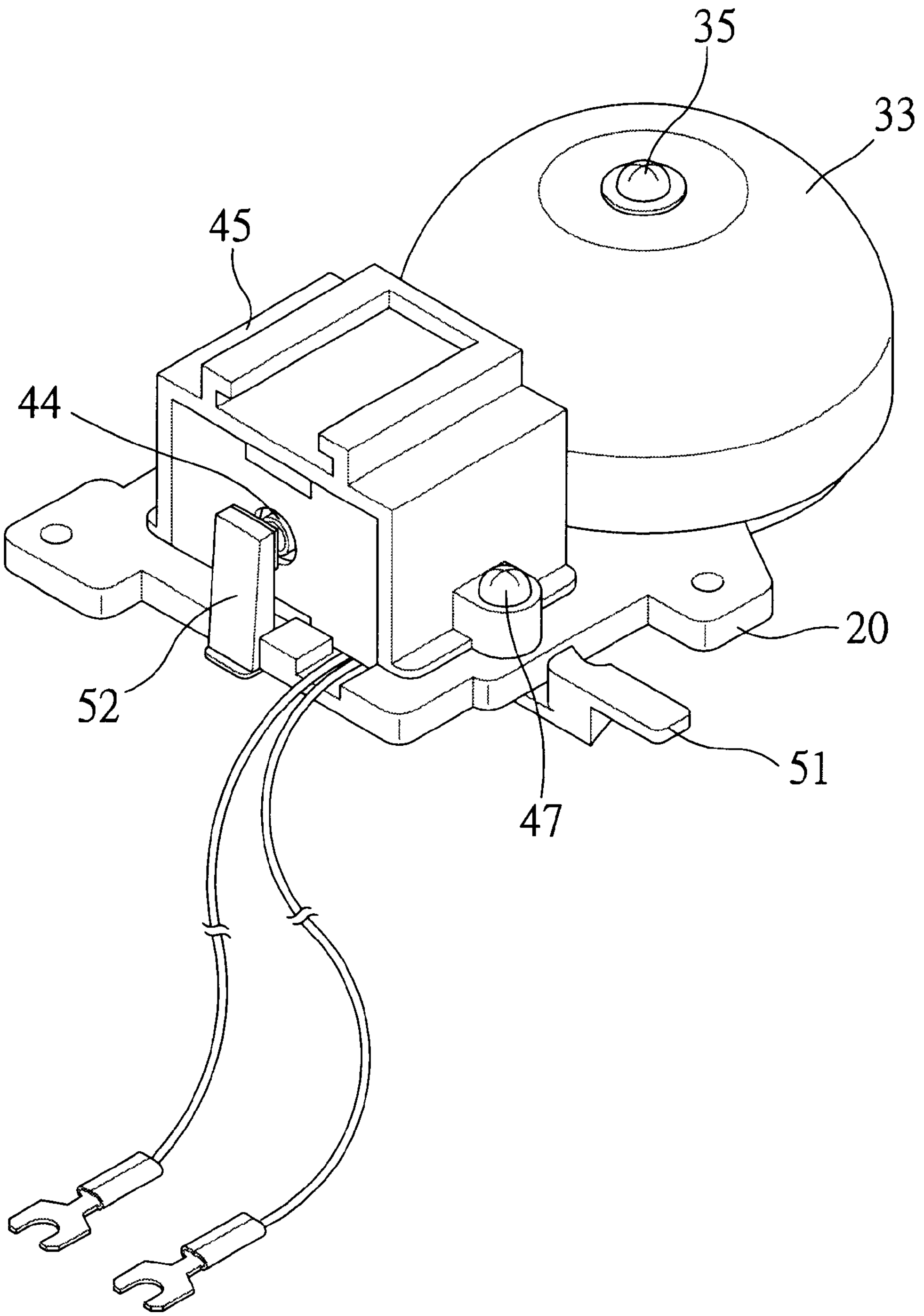
FIG. 6 is a perspective view of the assembled volume control apparatus of telephone according to the invention.

FIG. 6 shows an assembled volume control apparatus of telephone according to the invention. It is seen that the invention has simple components as compared to the prior art. Most importantly, the precision is enhanced and volume control is more effective.

While the invention has been described by means of specific embodiments, numerous modifications and variations could be made thereto by those skilled in the art without departing from the scope of the invention set forth in the claims.

What is claimed is:

1. A volume control apparatus of telephone comprising:

a base assembly including a central cylindrical member, a threaded bore in the cylindrical member, and a plurality of recesses;

a gong assembly including a plastic inner gong with a top hole and a metal outer gong with a top aperture wherein the inner gong is put on the central cylindrical member and the outer gong is threadedly secured to the bore to secure the gong assembly to the base assembly;

a drive device threadedly secured to the base assembly including a pair of opposed magnets, a ringer coil, a case for receiving the magnets, a clapper slidably provided in the ringer coil, and a cap member covered on the case; and a volume control assembly threadedly secured on the bottom of the base assembly including a lever having a protrusion and a hole, a bent stopper having a protrusion engaged with the hole of the lever, and an engagement member;

wherein the protrusion of the lever is selectively engaged with one of the recesses when the lever is moved to a locked position, resulting in a distance change of the clapper with respect to the engagement member and the gong assembly respectively, thereby generating a plurality of corresponding sound volumes when the clapper reciprocally hits on the gong assembly and the stopper.

2. The volume control apparatus of claim 1, wherein the number of recesses is three and one of the sound volumes is mute.

3. The volume control apparatus of claim 1, wherein the stopper comprises an elongate slot and the engagement member comprises a protrusion being inserted and slidable in the elongate slot.

4. The volume control apparatus of claim 1, wherein the clapper further comprises a pad made of plastic or metal material provided at either end.

5. The volume control apparatus of claim 4, wherein the stopper further comprises a cushion corresponding to the pad of the clapper.

* * * * *